(12) United States Patent
Atmur et al.

(10) Patent No.: US 10,968,969 B2
(45) Date of Patent: Apr. 6, 2021

(54) NUTATIONAL BRAKING SYSTEMS AND METHODS

(71) Applicant: The Boeing Company, Chicago, IL (US)

(72) Inventors: Robert J. Atmur, Whittier, CA (US); Thorin Arthur Rogers, Ahaheim, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/357,229

(22) Filed: Mar. 18, 2019

(65) Prior Publication Data

US 2020/0300316 A1    Sep. 24, 2020

(51) Int. Cl.
*F16H 1/32* (2006.01)
*F16D 65/12* (2006.01)
(Continued)

(52) U.S. Cl.
CPC .............. *F16D 65/12* (2013.01); *B60T 1/06* (2013.01); *B64C 25/44* (2013.01); *F16D 51/00* (2013.01);
(Continued)

(58) Field of Classification Search
CPC ...... F16D 55/025; F16D 55/22; F16D 55/224; F16D 55/225; F16D 55/226; F16D 55/2262; F16D 55/24; F16D 55/28; F16D 55/32; F16D 55/33; F16D 63/00; F16D 65/186; F16D 2125/44; F16D 2125/46; F16D 2125/54; F16D 25/08; F16H 1/321;
(Continued)

(56) References Cited

U.S. PATENT DOCUMENTS

| 37,165 A | 12/1862 | Gary |
| 1,611,981 A | 12/1926 | Amberg |

(Continued)

FOREIGN PATENT DOCUMENTS

| CH | 233459 A | 7/1944 |
| CN | 2276093 Y | 3/1998 |

(Continued)

OTHER PUBLICATIONS

European Patent Office, Examination Report in European Patent Application No. 17167409.6-1201, dated Mar. 18, 2019, 9 pages.

(Continued)

*Primary Examiner* — Bradley T King
*Assistant Examiner* — Stephen M Bowes
(74) *Attorney, Agent, or Firm* — Kolisch Hartwell, P.C.

(57) ABSTRACT

A brake system is disclosed, including a rotor rigidly connected to a shaft configured to rotate about a central axis. The rotor has a first side opposite from a second side, and the brake system includes a first stator structure on the first side of the rotor and a second stator structure on the second side of the rotor. The brake system further includes a first wobble plate between the first side of the rotor and the first stator structure and a second wobble plate between the second side of the rotor and the second stator structure. Each of the first and second wobble plates is configured to nutate when the first and second stator structures decrease rotation rate compared to the rotation rate of the rotor.

20 Claims, 5 Drawing Sheets

(51) Int. Cl.
    *B60T 1/06* (2006.01)
    *B64C 25/44* (2006.01)
    *F16D 51/00* (2006.01)
    *F16D 55/22* (2006.01)
    *F16D 65/10* (2006.01)
    *F16D 63/00* (2006.01)
    *F16D 65/02* (2006.01)

(52) U.S. Cl.
    CPC ............. *F16D 55/22* (2013.01); *F16D 65/10* (2013.01); *F16D 63/004* (2013.01); *F16D 2065/132* (2013.01)

(58) Field of Classification Search
    CPC ......... F16H 23/00; F16H 23/10; H02K 41/06; H02K 41/065
    USPC .................................................. 475/163, 164
    See application file for complete search history.

(56) References Cited

U.S. PATENT DOCUMENTS

| | | |
|---|---|---|
| 2,275,827 A | 3/1942 | Plensler |
| 2,458,983 A | 1/1949 | Dunn |
| 2,509,391 A | 5/1950 | Hansen et al. |
| 2,699,690 A | 1/1955 | Kobler |
| 2,703,370 A | 3/1955 | Steensen |
| 2,857,536 A | 10/1958 | Light |
| 2,866,110 A | 12/1958 | Schon |
| 2,871,382 A | 1/1959 | Bouvier |
| 2,908,191 A | 10/1959 | Sundt |
| 3,117,244 A | 1/1964 | Rosain et al. |
| 3,234,393 A | 2/1966 | Ruschmann |
| 3,249,776 A | 5/1966 | Anderson et al. |
| 3,322,984 A | 5/1967 | Anderson |
| 3,341,726 A | 9/1967 | Brinster et al. |
| 3,428,839 A | 2/1969 | Singleton et al. |
| 3,436,571 A | 4/1969 | French |
| 3,463,953 A | 8/1969 | Maxwell |
| 3,474,272 A | 10/1969 | Newell |
| 3,525,890 A | 8/1970 | Buchanan, Jr. |
| 3,539,847 A | 11/1970 | Gifford |
| 3,579,276 A | 5/1971 | Newell |
| 3,640,154 A | 2/1972 | Massie |
| 3,918,315 A | 11/1975 | Rouverol |
| 3,935,750 A | 2/1976 | Maroth |
| 4,041,808 A | 8/1977 | Ficklerscher |
| RE29,411 E | 9/1977 | Newell |
| 4,081,702 A | 3/1978 | Nuemann |
| 4,108,017 A | 8/1978 | Rouverol |
| 4,330,725 A | 5/1982 | Hintz |
| 4,495,432 A | 1/1985 | Katsuma et al. |
| 4,906,881 A | 3/1990 | Knight |
| 5,111,102 A | 5/1992 | Meeks |
| 5,383,821 A * | 1/1995 | Murakami .............. F16H 1/321 475/164 |
| 5,747,915 A | 5/1998 | Benavides |
| 5,804,898 A | 9/1998 | Kawai |
| 5,820,504 A | 10/1998 | Geralde |
| 5,893,813 A * | 4/1999 | Yamamoto ............. H02K 7/116 475/163 |
| 5,906,142 A | 5/1999 | Shirasawa |
| 5,954,610 A | 9/1999 | Kamimura |
| 6,131,459 A | 10/2000 | Seale et al. |
| 6,286,391 B1 * | 9/2001 | Gassmann ............. F16H 48/147 475/164 |
| 6,431,330 B1 | 8/2002 | Poertgen et al. |
| 6,568,929 B2 | 5/2003 | Takagi |
| 6,664,711 B2 | 12/2003 | Baudendistel |
| 7,165,473 B2 | 1/2007 | Kobayashi et al. |
| 7,540,865 B2 | 6/2009 | Griffin et al. |
| 7,824,345 B2 | 11/2010 | Euteneuer et al. |
| 7,841,994 B2 | 11/2010 | Skujins et al. |
| 7,850,623 B2 | 12/2010 | Griffin et al. |
| 7,878,984 B2 | 2/2011 | Jacobsen et al. |
| 7,914,466 B2 | 3/2011 | Davis et al. |
| 7,914,467 B2 | 3/2011 | Layman et al. |
| 7,969,055 B2 | 6/2011 | Titus |
| 8,022,331 B2 | 9/2011 | Reynolds et al. |
| 8,048,004 B2 | 11/2011 | Davis et al. |
| 8,048,060 B2 | 11/2011 | Griffin et al. |
| 8,105,246 B2 | 1/2012 | Voeller et al. |
| 8,137,293 B2 | 3/2012 | Zhou et al. |
| 8,169,118 B2 | 5/2012 | Filatov |
| 8,182,465 B2 | 5/2012 | Griffin et al. |
| 8,210,070 B2 | 7/2012 | Takahashi et al. |
| 8,231,551 B2 | 7/2012 | Griffin et al. |
| 8,257,279 B2 | 9/2012 | Davis et al. |
| 8,368,269 B2 | 2/2013 | Titus |
| 8,376,961 B2 | 2/2013 | Layman et al. |
| 8,377,035 B2 | 2/2013 | Zhou et al. |
| 8,409,114 B2 | 4/2013 | Parins |
| 8,449,526 B2 | 5/2013 | Snyder et al. |
| 8,535,243 B2 | 9/2013 | Shireman |
| 8,551,020 B2 | 10/2013 | Chen et al. |
| 8,551,021 B2 | 10/2013 | Voeller et al. |
| 8,556,914 B2 | 10/2013 | Vrba |
| 8,636,716 B2 | 1/2014 | Griffin et al. |
| 8,646,360 B2 | 2/2014 | Kanai |
| 8,936,525 B2 | 1/2015 | Shimada |
| 9,124,150 B2 | 9/2015 | Atmur |
| 9,164,497 B2 | 10/2015 | Cameron et al. |
| 9,281,736 B2 | 3/2016 | Atmur |
| 9,404,489 B1 | 8/2016 | Atmur |
| 9,427,866 B2 | 8/2016 | Hasegawa |
| 9,768,664 B2 | 9/2017 | Atmur et al. |
| 9,929,623 B2 | 3/2018 | Atmur |
| 10,024,391 B2 | 7/2018 | Atmur et al. |
| 2009/0064812 A1 | 3/2009 | Gutmann et al. |
| 2010/0224435 A1 | 9/2010 | Yamamori |
| 2011/0162471 A1 | 7/2011 | Takahashi |
| 2013/0097865 A1 * | 4/2013 | Ando ...................... B23F 15/00 29/893.3 |
| 2013/0134803 A1 | 5/2013 | Goepel |
| 2013/0319145 A1 | 12/2013 | Shimada |
| 2014/0246893 A1 * | 9/2014 | Tesar ................... B60K 7/0007 301/6.5 |
| 2014/0285072 A1 | 9/2014 | Atmur et al. |
| 2015/0015174 A1 | 1/2015 | Atmur |
| 2015/0024896 A1 | 1/2015 | Takahashi et al. |
| 2015/0091491 A1 | 4/2015 | Cameron et al. |
| 2015/0209966 A1 * | 7/2015 | Hasegawa ................ F16H 1/12 74/490.03 |
| 2015/0224642 A1 | 8/2015 | Hasegawa |
| 2015/0340912 A1 | 11/2015 | Calley |
| 2016/0172928 A1 | 6/2016 | Atmur |
| 2016/0172929 A1 | 6/2016 | Atmur et al. |
| 2016/0327015 A1 | 11/2016 | Ida et al. |
| 2016/0341283 A1 | 11/2016 | Robuck et al. |
| 2016/0344255 A1 | 11/2016 | Atmur et al. |
| 2017/0122409 A1 | 5/2017 | Atmur et al. |
| 2017/0191549 A1 | 7/2017 | Atmur et al. |
| 2017/0317546 A1 | 11/2017 | Atmur |
| 2018/0034355 A1 | 2/2018 | Peck, Jr. et al. |
| 2018/0252279 A1 | 9/2018 | Atmur et al. |
| 2018/0306278 A1 | 10/2018 | Atmur et al. |
| 2018/0320760 A1 | 11/2018 | Atmur et al. |
| 2019/0011027 A1 * | 1/2019 | Edelson ............... B60K 7/0007 |

FOREIGN PATENT DOCUMENTS

| | | |
|---|---|---|
| CN | 203098755 U | 7/2013 |
| CN | 104065202 A | 9/2014 |
| DE | 10028964 A1 | 1/2002 |
| DE | 10237686 A1 | 2/2004 |
| DE | 102009002587 A1 | 10/2010 |
| DE | 10237686 B4 | 4/2013 |
| EP | 0565746 A1 | 10/1993 |
| EP | 2169263 A1 | 3/2010 |
| EP | 2169263 B1 | 10/2011 |
| EP | 2535136 A1 | 12/2012 |
| EP | 2782230 A2 | 9/2014 |
| EP | 2838186 A2 | 2/2015 |
| EP | 2933531 A1 | 10/2015 |

(56) References Cited

FOREIGN PATENT DOCUMENTS

| EP | 3096444 | A1 | 11/2016 |
|---|---|---|---|
| EP | 3165789 | A2 | 5/2017 |
| GB | 2216982 | A | 3/1989 |
| GB | 2211900 | A | 7/1989 |
| GB | 2211900 | B | 7/1989 |
| GB | 2327998 | A | 2/1999 |
| JP | 59113345 | A | 6/1984 |
| JP | 6017749 | | 1/1985 |
| JP | 2014187867 | A | 10/2014 |
| JP | 2015039286 | A | 2/2015 |
| WO | 2008149696 | A1 | 12/2008 |
| WO | 2011154981 | A1 | 12/2011 |
| WO | 2014034320 | A1 | 3/2014 |
| WO | 2014051131 | A1 | 4/2014 |
| WO | 2014107474 | A1 | 7/2014 |
| WO | 2014118284 | A2 | 8/2014 |

OTHER PUBLICATIONS

Antonio S de Castro; Exploring a rehnomic system; Dec. 23, 1999, retrieved from the internet at https://arxiv.org/pdf/physics/9912049.pdf, 6 pages.
Machine Design, Sometimes it Pays to be Eccentric, May 18, 2000, retrieved from the internet on Feb. 18, 2015 from http://machinedesign.com/archive/sometimes-it-pays-be-eccentric, 7 pages.
Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.
Machine Design, Flatter reducer makes waves, Jan. 24, 2002, retrieved from the internet on Feb. 18, 2015 from http://machinedesign.com/archive/flatter-reducer-makes-waves, 4 pages.
Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.
M. Elmoznino et al., An electro-mechanical Pericyclic CVT (P-CVT), 12th IFToMM World Congress, Besancon, France, Jun. 18-21, 2007, 6 pages.
Francesco Fasso et al., An elemental overview of the nonholonomic Noether theorem, Oct. 18, 2009, 11 pages.
Susman, Zeke, Harmonic Drive, EVE5320 Mechatronics, Department of Electrical and Computer Engineering, Utah State University, Mar. 11, 2010, retrieved from the Internet on Feb. 18, 2015 from http://mechatronics.ece.usu.edu/ece5320/Schedule/hw01-2010/hw1_Zeke_Susman_a.ppt, 27 pages.
Lipton, Tom, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.
Harmonic Drive Systems, Inc., Strengths of HarmonicDrive®, retrieved from the Internet on Feb. 18, 2015 from http://www.hds.co.jp/english/company/business/strength/, 5 pages.
Francesco Fasso et al., Conservation of energy and momenta in nonholonomic systems with affine constraints, May 5, 2015, 16 pages.
European Patent Office, Extended European Search Report in European Patent Application No. 16156922.3-1806, dated Sep. 30, 2016, 6 pages.
European Patent Office, Extended European Search Report in European Patent Application No. 16196546.2-1762, dated May 3, 2017, 9 pages.
European Patent Office, Extended European Search Report in European Patent Application No. 16194812.0-1762, dated Jun. 7, 2017, 8 pages.
U.S. Patent and Trademark Office, Non-Final Office Action in U.S. Appl. No. 14/989,760, dated Sep. 21, 2017, 40 pages.
European Patent Office, Extended European Search Report in European Patent Application No. 17167409.6-1809, dated Sep. 22, 2017, 9 pages.
U.S. Patent and Trademark Office, Non-Final Office Action in U.S. Appl. No. 14/932,901, dated Feb. 23, 2018, 48 pages.
U.S. Patent and Trademark Office, Non-Final Office Action in U.S. Appl. No. 15/585,544, dated Jul. 11, 2018, 68 pages.
European Patent Office, Extended European Search Report regarding European Patent Application No. 18169556.0-1012, dated Oct. 5, 2018, 10 pages.
European Patent Office, Examination Report in European Patent Application No. 16196546.2-1012, dated Dec. 13, 2018, 5 pages.
European Patent Office, Extended European Search Report regarding European Patent Application No. 20160360.2, dated Sep. 24, 2020, 5 pages.

* cited by examiner

NUTATIONAL BRAKING SYSTEMS AND METHODS

FIELD

This disclosure relates to systems and methods for braking. More specifically, the disclosed examples relate to decelerating a rotating object using a nutating gear mechanism to dissipate rotational energy.

INTRODUCTION

Braking systems are essential to many machines. Frictional brakes are commonly used, such as disc brakes or drum brakes. As indicated in the name, frictional brakes use friction to slow rotational motion. A caliper, lever arm, or other mechanism forces a pad or shoe into frictional contact with a rotating rotor or drum, converting kinetic energy of rotation into thermal energy. Pads and shoes are often short-lived components because of heat damage or wear damage and may require regular replacement.

Aircraft demand high performance from braking systems that generate significant levels of heat. Reducing thermal output can mean improved safety and longer lifespan for components. Multiple redundant braking systems may be used to improve aircraft safety. However, space and weight are at a premium in aircraft design. A lighter and more compact brake system is therefore highly desirable.

The present disclosure also relates to nutating gear mechanisms of the type commonly known as a wobble plate mechanism. Historically, wobble plate mechanisms have seemed a promising route toward high torque density. In a wobble plate mechanism, a gear, for example a rotor gear, nutates around another gear, for example a stator gear. Surprisingly, wobble plate mechanisms can also provide a route toward a compact brake, as will be understood in more detail below.

SUMMARY

The present disclosure provides systems, apparatuses, and methods relating to brake systems. In some examples, a brake system may include a rotor rotationally connected to a shaft configured to rotate about a central axis. The rotor may have a first side opposite from a second side, and the brake system may include a first stator structure on the first side of the rotor and a second stator structure on the second side of the rotor. The brake system may further include a first wobble plate between the first side of the rotor and the first stator structure and a second wobble plate between the second side of the rotor and the second stator structure. Each of the first and second wobble plates may be configured to nutate when the first and second stator structures decrease rotation rate compared to the rotation rate of the rotor.

In some examples, a brake system may include a first stator gear and a second stator gear rigidly connected to the first stator gear. A rotor gear may be disposed between the first stator gear and the second stator gear. A first wobble gear may engage the first stator gear and the rotor gear, and a second wobble gear may engage the second stator gear and the rotor gear. Rotation of the rotor gear may cause the first wobble gear, the second wobble gear, the first stator gear and the second stator gear to rotate. Slowing the first and second stator gears relative to the rotor gear may induce nutation of the first and second wobble gears, and nutation of the first and second wobble gears may slow the rotor.

In some examples, a method of dissipating rotation energy in a braking system may include providing a drive shaft connected to a rotor and a pair of wobble plates engaging opposite sides of the rotor, each wobble plate having an outer side engaging a stator structure. The method may further include rotating the drive shaft, rotor, pair of wobble plates, and stator structures at a same rotational speed, and inducing nutation of the pair of wobble plates by slowing the rotational speed of the stator structures.

Features, functions, and advantages may be achieved independently in various examples of the present disclosure, or may be combined in yet other examples, further details of which can be seen with reference to the following description and drawings.

DETAILED DESCRIPTION

Figure 1:
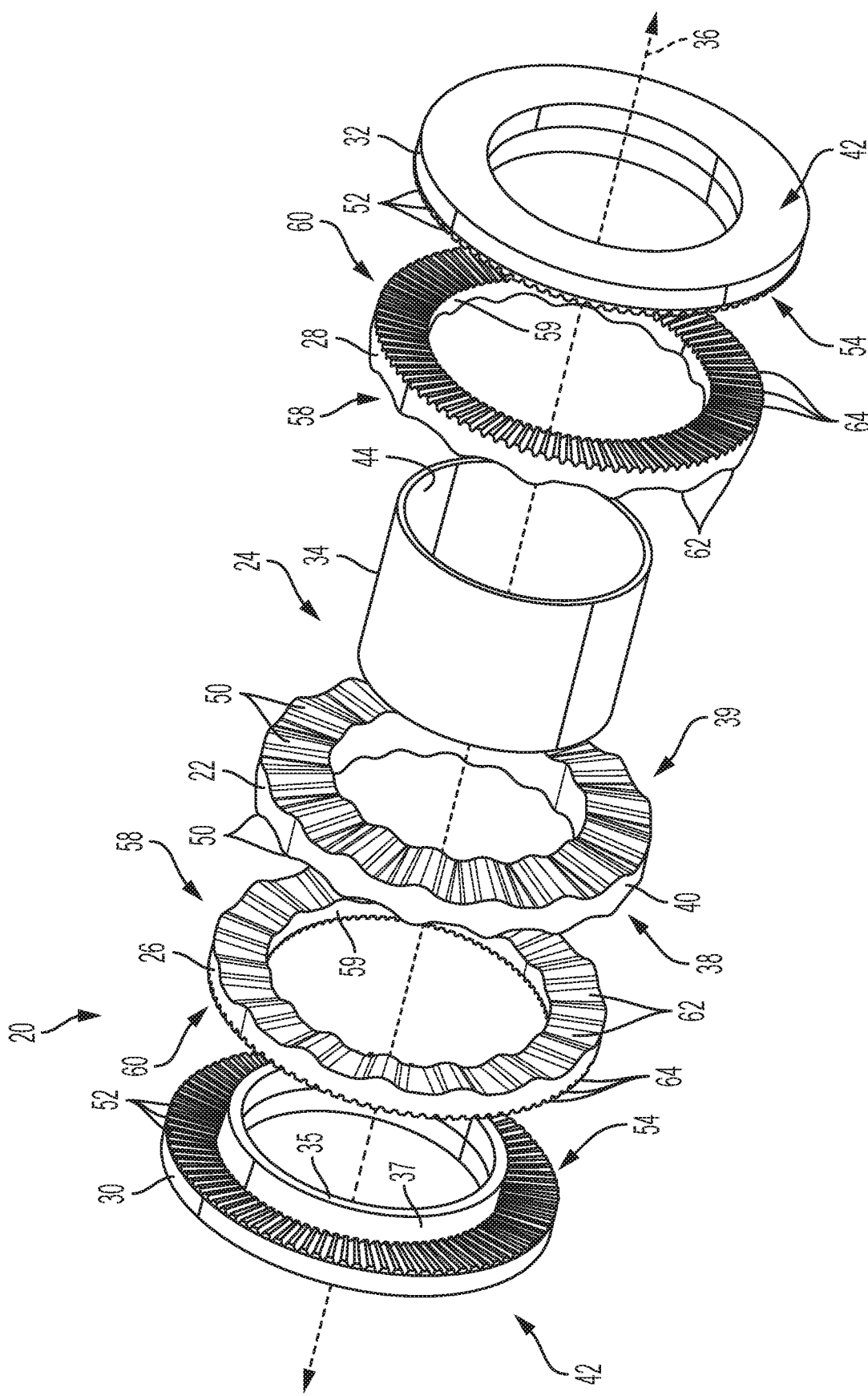
FIG. 1 is an isometric exploded view of an illustrative brake module in accordance with aspects of the present disclosure.

Various aspects and examples of a brake system including dual nutating gears, as well as related apparatus and methods, are described below and illustrated in the associated drawings. Unless otherwise specified, a brake system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, a brake system in accordance with the present teachings may include a rotor, a pair of wobble gears, and a stator structure. Such a brake system may be described as a nutational braking system having dual stators and/or dual nutating gears, and/or as an energy absorber. The rotor, wobble gears, and stator structure may be described as a nutational brake module.

The rotor may include teeth on first and second sides, and the stator structure may include first and second stator gears. A first of the pair of wobble gears may be sandwiched between, and engaged with, the first side of the rotor and the first stator gear. The second of the pair of wobble gears may be sandwiched between, and engaged with, the second side of the rotor and the second stator gear.

The rotor may be rotationally coupled to a rotating body, such as a wheel, an axle, or a drive shaft. The rotor may be rigidly, movably, and/or flexibly coupled to the rotating body. For example, a periphery of the rotor may be keyed to a wheel, similarly to a floating disc brake. For another example, a drive shaft may extend through and be welded to a central aperture of the rotor. The rotor may be driven when the rotating body is under a torque load and may be undriven when no torque is applied. The brake system may slow the rotating body and/or resist acceleration of the rotating body by slowing rotation and/or resisting acceleration of the rotor.

The stator structure may include first and second stator gears rigidly fixed together by a hollow cylinder. For example, a cylindrical sleeve may extend through and be fixed to central aperture of each stator gear. For another example, a cylindrical sleeve may enclose and be fixed to a periphery of each stator gear. The brake system may further include a braking mechanism configured to slow rotation of the stator structure. For example, the brake system may include a frictional braking mechanism such as a disc brake pad or a drum brake shoe.

The brake system may have a braking mode and an un-braked or non-braking mode. In the non-braking mode the rotor, wobble plates, and stator structure may rotate together with the rotating body. In the braking mode the braking mechanism may engage the stator structure to slow the stator structure relative to the rotor. When the stator structure is slowed or stopped relative to the rotor, the interaction of the teeth of each stator gear, the corresponding wobble gear, and the rotor may induce nutation of the pair of wobble plates. The nutation may absorb rotational energy, slowing rotation of the wobble plates, which may in turn slow rotation of the rotor.

Examples, Components, and Alternatives

The following sections describe selected aspects of exemplary brake systems as well as related apparatus and/or methods. The examples in these sections are intended for illustration and should not be interpreted as limiting the entire scope of the present disclosure. Each section may include one or more distinct examples, and/or contextual or related information, function, and/or structure.

A. Illustrative Brake Module

Figure 2:
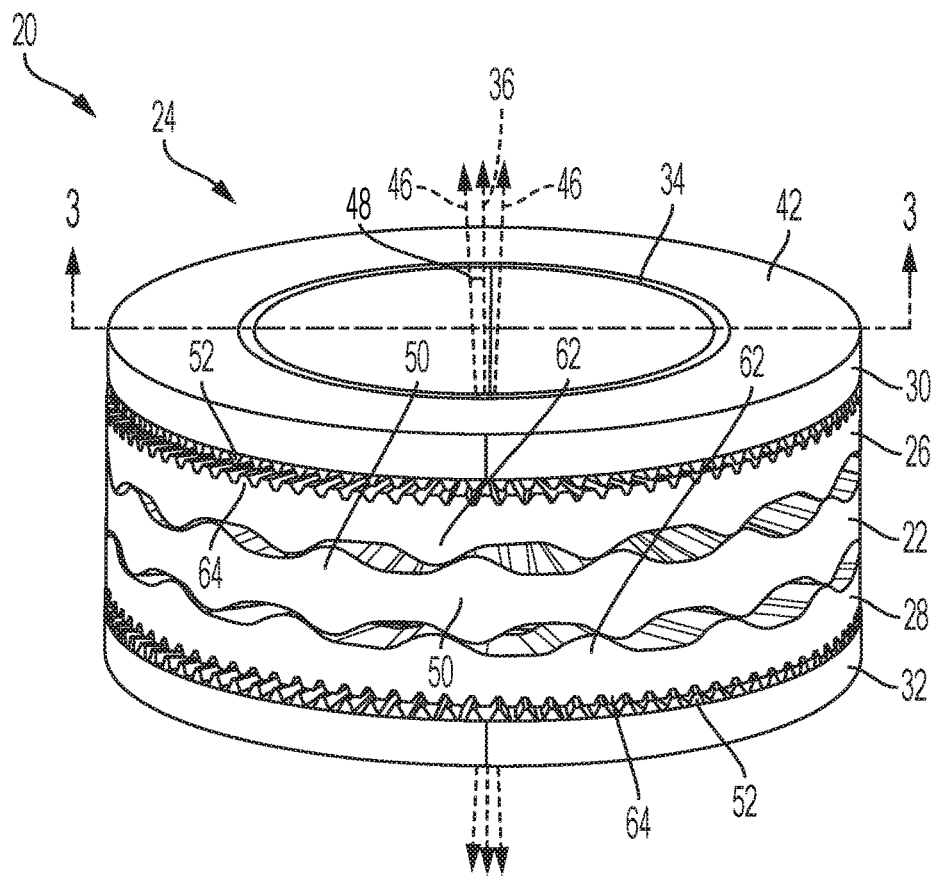
FIG. 2 is an isometric side view of the brake module of FIG. 1.
Figure 3:
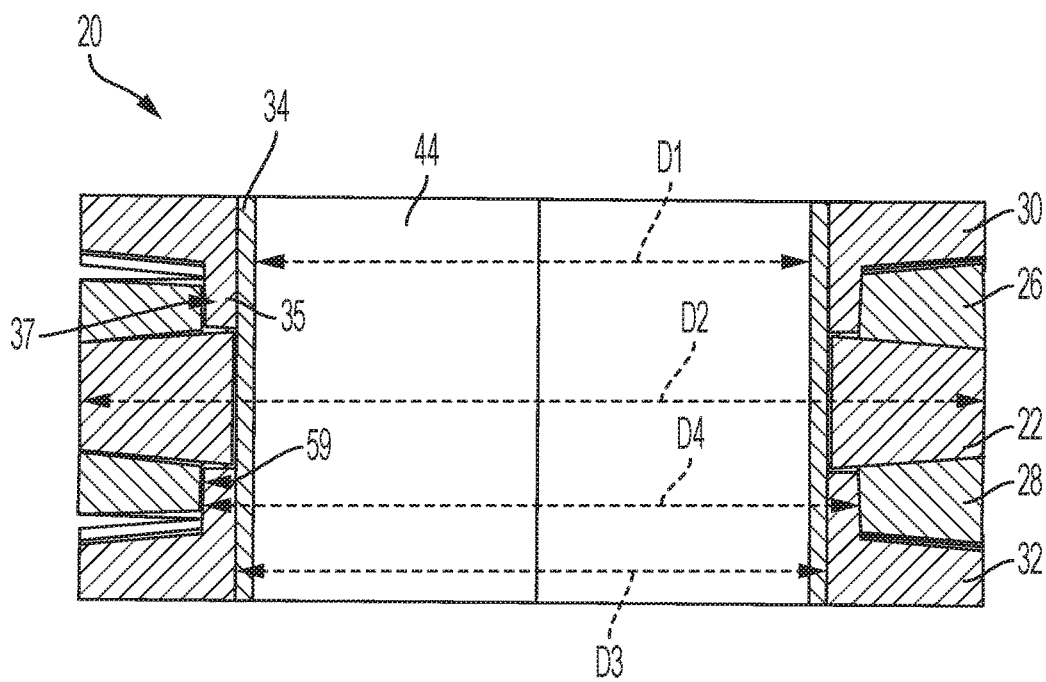
FIG. 3 is a cross-sectional view of the brake module of FIG. 2, along line 3-3.

As shown in FIGS. 1-3, this section describes an illustrative brake module 20. Brake module 20 is an example of a dual stator nutational brake module, described above. FIG. 1 is an exploded view of brake module 20. In FIG. 2, the brake module is shown assembled for operation. Brake module 20 includes a rotor 22, a stator structure 24, a first wobble plate 26, and a second wobble plate 28. The stator structure includes a first stator 30 and a second stator 32, rigidly connected by a hollow cylindrical sleeve 34.

Each of rotor 22, stators 30, 32 and wobble plates 26, 28 is annular, with a central aperture. When assembled, sleeve 34 extends through the central apertures, defining a central axis 36 of brake module 20. First wobble plate 26 is disposed between a first side 38 of rotor 22 and first stator 30. Second wobble plate 28 is disposed between a second side 39 of the rotor and second stator 32. Rotor 22 is sandwiched between the two wobble plates. The rotor and wobble plates are in turn sandwiched between the two rigidly connected stators.

Rotor 22 is configured to rotate about central axis 36, which may also be referred to as an axis of rotation of brake module 20. The rotor may also be described as concentric about sleeve 34 and/or coaxial with the sleeve. The rotor rotates without a bearing around sleeve 34. Rotor 22 is free to slide or float along the sleeve and may be centered along the sleeve by wobble plates 26, 28 as described in further detail below. In some examples, rotor 22 may be suspended and/or supported by connection to an exterior rotating structure, not shown. In such examples, the rotor may not contact sleeve 34. That is, a gap may be maintained between an inner surface of rotor 22 and an outer surface of sleeve 34.

Rotor 22 may be rotationally coupled to an exterior structure rigidly, movably, and/or in any appropriate manner. For example, a peripheral edge 40 of the rotor may be keyed into a rim of a wheel or may be rigidly fixed to a drive shaft. Rotation, rotational energy, and/or torque may be input to brake module 20 by rotation of rotor 22. Brake module 20 may brake such rotation and/or dissipate rotational energy by slowing the rotor.

Stator structure 24 is also configured to rotate about central axis 36. First stator 30, second stator 32, and sleeve 34 may rotate together, and may be described as coaxial. Sleeve 34 is received in the central aperture of each stator, fixed to an inner surface. The sleeve may lie flush with a distal surface 42 of each stator. Stator structure 24 may also be described as coaxial with rotor 22.

Stator structure 24 may be configured to interface with a brake pad, not shown. In the present example, distal surface 42 of each of the first and second stators 30, 32 is a planar surface. Brake pads may be pressed against distal surfaces 42, slowing and stopping rotation of stator structure 24 similarly to a disc brake. For another example, a brake shoe may engage an inner surface 44 of sleeve 34 similarly to a drum brake, or a brake shoe may engage a peripheral edge of each stator 30, 32 similarly to a clasp brake.

Each stator 30, 32 of stator structure 24 includes a shoulder 35, shown in FIGS. 1 and 3. The shoulder extends from the stator parallel to central axis 36, and is disposed radially inward of a proximal surface 54, which opposes distal surface 42 of stator 30 along central axis 36. The shoulder may also be described as extending toward rotor 22. Each shoulder 35 partially defines the central aperture of the stator 30, 32 and is fixed to sleeve 34. An inner surface of each shoulder 35 may be cylindrical and/or complementary to sleeve 34. An outer surface 37 of each shoulder 35 may be sloped and/or curved from a widest point proximate proximal surface 54 radially inward to a narrowest point at an edge of the shoulder.

First wobble plate 26 and second wobble plate 28 each have a central wobble axis 46. Each wobble plate is angled relative to rotor 22 and stator structure 24. Each wobble axis 46 may be described as forming a non-zero wobble angle 48. Wobble angle 48 may be the same for each wobble plate, but the wobble angles may lie in different planes. That is, each wobble axis 46 may form the same angle with central axis 36, but wobble axis 46 of first wobble plate 26 may define a first plane with the central axis and wobble axis 46 of the second wobble plate 28 may define a second plane with the central axis. The first and second planes may be the same or may be perpendicular.

First wobble plate 26 and second wobble plate 28 are each configured to rotate about central axis 36 and to nutate such that wobble axis 46 precesses about the central axis. Wobble plates 26, 28 may each rotate with rotor 22 and nutate about the corresponding stator 30, 32. When stator structure 24 is free to rotate, the wobble plates may not nutate and the wobble plates, rotor, and stator structure may all rotate together. When stator structure 24 is slowed or stopped relative to rotor 22, the wobble plates may be induced to nutate. The nutation may dissipate energy, slowing rotation of the wobble plates, and in turn slowing the rotor.

Wobble plates 26 and 28 may be described as having a point of closest approach to rotor 22. That is at any time, a point on the outer circumference of each wobble plate may be closest to the rotor. The point may move as the wobble plate nutates. At any time, the point of closest approach of first wobble plate 26 may be aligned with the point of closest approach of second wobble plate 28, or may be out of phase by 90, 180 or 270 degrees. As the wobble plates nutate, the point of closest approach of first wobble plate 26 may maintain the same phase shift relative to the point of closest approach of second wobble plate 28.

As shown in FIG. 3, a cross-sectional view of brake module 20, each wobble plate 26, 28 is spaced from sleeve 34. Each wobble plate rotates without a bearing around shoulder 35 of the corresponding stator 30, 32. That is, shoulder 35 of first stator 30 supports and axially aligns first wobble plate 26, and shoulder 35 of second stator 32 supports and axially aligns second wobble plate 28.

Outer surface 37 of shoulder 35 of each stator 30, 32 is complementarily shaped to an inner surface 59 of each wobble plate 26, 28. Outer surface 37 and inner surface 59 are both curved, and deviate from a true cylindrical shape. The curve of surfaces 37, 59 may be selected to align each wobble plate 26, 28 at the selected wobble angle and allow smooth rotation at that angle.

When assembled as shown in FIG. 3, brake module 20 has an overall cylindrical shape, with an inner diameter D1 defined by inner surface 44 of sleeve 34 and an outer diameter D2 defined by the peripheral edges of stators 30, 32, wobble plates 26, 28, and rotor 22. To form this shape, each of the stators, wobble plates and rotor have an approximately equal outer diameter.

Stators 30, 32 and rotor 22 each have an inner diameter D3 approximately equal to an outer diameter of sleeve 34. Wobble plates 26, 28 have an inner diameter D4 which is smaller than diameter D3, and approximately equal to an outer diameter of shoulder 35 of stators 30, 32. In the present example, diameter D4 varies axially. That is, shoulders 35 are each sloped from a distal end to a proximal end to allow for the wobble angle of wobble plates 26, 28.

Brake module 20 is designed to eliminate eccentric forces, and balance wobble plates 26, 28. Complementary frustoconical shapes urge the wobble plates back into alignment if the brake module experiences vibration or displacement. More specifically, first side 38 and second side 39 of rotor 22 are each frustoconical. That is, each side is angled relative to a plane perpendicular to the central axis 36, so that every point on the surface includes a frustoconical line that can be extended to a vertex located on the central axis, distal from the rotor. When rotor 22 is assembled with first wobble plate 26 and second wobble plate 28 in brake module 20, the frustoconical vertex of first side 38 may be proximate a center of mass of first wobble plate 26 and the frustoconical vertex of second side 39 may be proximate a center of mass of second wobble plate 28.

Proximal surface 54 of each of stators 30 and 32 is also frustoconical. That is, the surface is angled relative to a plane perpendicular to the central axis 36, so that every point on the surface includes a frustoconical line that can be extended to a vertex located on the central axis, proximal of the stator. When first stator 30 is assembled with first wobble plate 26 in brake module 20, the frustoconical vertex of proximal surface 54 may be proximate a center of mass of the first wobble plate. Similarly, when second stator 32 is assembled with second wobble plate 28 in brake module 20, the frustoconical vertex of proximal surface 54 may be proximate a center of mass of the second wobble plate.

Wobble plates 26 and 28 each have a proximal face 58 and an opposing distal face 60. Each face is frusticonal. That is, proximal face 58 and distal face 60 are each angled relative to a plane perpendicular to wobble axis 46, such that every point on the surface includes a frustoconical line that can be extended to a frustoconical vertex located on the wobble axis proximate a center of mass of the wobble plate.

Each of wobble plates 26, 28, stators 30, 32, and rotor 22 include teeth and may be referred to as gears. Rotor 22 includes a plurality or set of rotor teeth 50 disposed on each of first side 38 and second side 39. The number of rotor teeth 50 on first side 38 may be equal to the number of rotor teeth 50 on second side 39. The number may be any appropriate number. In the depicted example, there are sixteen rotor teeth on each side. The number of rotor teeth may be selected to allow a desired width of each tooth. That is, the number of teeth may be selected according to a radius of rotor 22 such that the angular width of the tooth corresponds to a desired tooth size. Wide teeth may provide strength sufficient for high torque loads experienced under braking conditions.

Each rotor tooth may include two engaging faces and each engaging face may be planar, composed of more than one plane, or may be composed of one or more surfaces with curvature. One or both engaging surfaces of a rotor tooth 50 may be defined by a compound involute of a circle and an ellipse, as detailed further below. Alternately, the curve may be the projection of a virtual ellipse onto the tooth location for all angles between 0 and $2\pi$ radians. Each rotor tooth extends from rotor 22 along central axis 36.

First stator 30 and second stator 32 are matching but mirrored in orientation. Description of first stator 30 may be understood to equivalently describe second stator 32. Stator 30 includes a plurality or set of stator teeth 52, disposed on proximal surface 54. Stator teeth 52 extend toward rotor 22, parallel to central axis 36. The number of stator teeth 52 may be any appropriate number. In the depicted example, there are ninety stator teeth. The number of stator teeth may be selected in combination with the shape of the stator teeth to provide effective engagement between the stator and the wobble plate.

Each stator tooth includes two engaging surfaces. Each engaging surface may be planar, composed of more than one plane, or composed of one or more surfaces with curvature. In the depicted example, stator teeth 52 may be described as wedge-shaped. Each stator tooth may be anchored to and/or extend from both proximal surface 54 and shoulder 35.

First wobble plate 26 and second wobble plate 28 are also matching but mirrored in orientation when assembled in brake module 20. Description of first wobble plate 26 may be understood to equivalently describe second wobble plate 28. References to interaction with first stator 30 may be understood to apply to second stator 32 for second wobble plate 28.

A plurality or set of face teeth 64 are disposed on distal face 60 of wobble plate 26. The face teeth are configured to engage stator teeth 52 of stator 30. Face teeth 64 extend from distal face 60 in an axial direction along wobble axis 46. The number of face teeth 64 may be any appropriate number. In the depicted example there are ninety face teeth. The number of face teeth may be selected to match the number of stator teeth 52, to achieve a 1:1 gear ratio. In some examples, the number of face teeth may be selected to achieve other desired gear ratios. For instance, another gear ratio may be desirable to decrease the rotation rate of the stator in order to facilitate engagement of a braking mechanism. In such examples, the number of face teeth 64 may be more, or less than the number of stator teeth 52.

Each face tooth includes two engaging faces, which may be planar, composed of more than one plane, or may be composed of one or more surfaces with curvature. In the present example, face teeth 64 are shaped to complement stator teeth 52 and may be described as wedge-shaped.

Wobble plate 26 further includes a plurality or set of wobble teeth 62, disposed on proximal face 58. The wobble teeth are configured to engage rotor teeth 50 of rotor 22. Wobble teeth 62 extend from proximal face 58 in an axial direction along wobble axis 46. The number of wobble teeth 62 may be any appropriate number. In the depicted example, there are fifteen wobble teeth. The number of wobble teeth may be selected to be different from the number of rotor teeth 50 by one, or by a similarly small number. A small difference in the number of teeth may provide high torque density, and increase the ratio of rotations to nutations performed by the wobble plate, as explained further below.

Each wobble tooth 62 includes a first engaging surface, and on the opposite side of the tooth a second engaging surface. Each surface may be planar, composed of more than one plane, or composed of one or more surfaces with curvature. One or both engaging surfaces of a wobble tooth 62 may be defined by a compound involute of a circle and an ellipse, as outlined below. Alternately, the curve may be the projection of a virtual ellipse onto the tooth location for all angles between 0 and $2\pi$ radians.

Wobble plate 26 and rotor 22 are each substantially circular in shape, with a projection of the wobble plate onto the rotor being elliptical in shape. The pluralities of wobble teeth 62 and rotor teeth 50 may be contoured by projecting this virtual ellipse onto the tooth location. The elliptical projection of wobble plate 26 onto rotor 22 may thereby be constrained to non-eccentric rotation. Eccentric motion, if allowed, may drive large imbalance forces creating unacceptable system performance.

For each tooth of both pluralities of wobble teeth 62 and rotor teeth 50, one or both of the first engaging surface and second engaging surface may be defined by a compound involute of a circle and an ellipse. That is, the curve of each of the first and the second engaging surfaces may be defined by an equation:

$$y = C(\sin(|\varphi|) - |\varphi|\cos(|\varphi|))^D$$

where C is a constant which may be proportional to a radius of the wobble plate, $\varphi$ may take values from 0 to $\frac{\pi}{2}$ radians, and D may have be a positive constant less than 1. D may have a value of approximately 0.65, though other values are also possible. The equation may be normalized to unity, or to a radius of the rotor.

The curve of the first engaging surface may be a mirror image of the curve of the second engaging surface, reflected across a plane through the apex of the tooth and containing the axis of rotation. Also, the first engaging surface and the second engaging surface may meet smoothly at the apex of each tooth. The cross-sectional shape of the tooth may therefore be defined by a compound involute of a circle and an ellipse.

First wobble plate 26 engages both rotor 22 and first stator 30, meshing partially with each. Similarly, second wobble plate 28 engages both rotor 22 and second stator 32, meshing partially with each. Rotation of rotor 22 may thereby cause wobble plates 26, 28 to rotate, which may in turn cause stators 30, 32 to rotate. When stators 30, 32 are slowed by a braking action, the wobble plates may be urged into nutation, which in turn may cause rotor 22 to slow.

Engagement between each wobble plate and rotor 22 may be between subsets of wobble teeth 62 and rotor teeth 50. When the rotor rotates in a given direction an engaging face of a rotor tooth may contact an engaging face of a wobble tooth. That is, there may be a contact force exerted on the wobble plate by the rotor through an interaction between the engaging faces of the plurality of rotor teeth and the engaging faces of the plurality of wobble teeth. These contact forces may cause the wobble plate to rotate in the same given rotation direction.

Engagement between each wobble plate and the corresponding stator may be between subsets of face teeth 64 and stator teeth 52. When the wobble gear rotates in a given rotation direction an engaging face of a face tooth may contact an engaging face of a stator tooth. That is, there may be a contact force exerted on the stator by the wobble plate through an interaction between the engaging faces of the plurality of face teeth and the engaging faces of the plurality of stator teeth.

In a case where no braking action engages stator structure 24, stators 30, 32 may be free to rotate. The contact force between the face teeth 64 of wobble plates 26, 28 and stator teeth 52 may then cause stators 30, 32 to rotate in the given rotation direction. In the present example, each wobble plate has ninety face teeth and each stator has ninety stator teeth. That is, each stator and corresponding wobble plate interact and rotate according to a gear ratio of 1:1. For every single complete rotation of the wobble plate, the stator also completes exactly one complete rotation. Other choices for the numbers of input and face teeth are possible and would result in a different gear ratio.

In a case where a braking action engages stator structure 24, rotation of stators 30, 32 may be slowed relative to rotor 22 or stopped. The contact forces between face teeth 64 and stator teeth 52 may then cause wobble plates 26, 28 to nutate.

In the example of brake module 20, rotor 22 has sixteen rotor teeth and each wobble plate 26, 28 has fifteen wobble teeth. As each wobble plate nutates, each wobble tooth 62 may engage with one tooth in the plurality of rotor teeth 50 during a single nutation. As there is one more rotor tooth than wobble teeth, the wobble plate may rotate slightly during a single nutation. In the present example, the wobble plate may rotate $\frac{1}{16}^{th}$ of a complete rotation during a single nutation. In other words, if the wobble plate rotates by $\frac{1}{16}^{th}$ of a complete rotation, perhaps due to an interaction with the rotor, the wobble plate may complete one full nutation. Thus, the wobble plate and the rotor may interact according to a gear ratio of 16:1. For every 16 nutations of the wobble plate, the wobble plate may rotate exactly once. Other choices for the numbers of rotor teeth and wobble teeth are possible, and would result in a different gear ratio. To balance brake module 20, the same gear ratio may be chosen for both wobble plates.

The brake module may be understood as a mechanically constrained system governed by Euler's equations for a wobbling plate, which create a rotating inertial reference frame. Consider Euler's z-axis equation, $$T_z = I_z \dot{\omega}_z - (I_x - I_y) \omega_x \omega_y$$

where T is torque, I is moment of inertia, and ω is angular velocity. This equation shows that depending on the direction of torque, an axis will experience an opposing rotation. Torque, or kinetic energy, may enter the system and be accepted as opposing rotations. No net momentum is stored, and all input energy may be used in changing a momentum vector of the wobble plates.

As previously described, wobble teeth 62 and rotor teeth 50 may be configured to provide a mechanical constraint on motion of wobble plates 26, 28. A relationship between input rotational torque, kinetic energy of one of the wobble plates, and rotating strain torque of rotor 22 under that mechanical constraint may be expressed as $$\sin(2\theta) T_z = I_z \dot{\omega}_z - I_x \omega_x^2$$

where θ is the angle between wobble axis 46 and central axis 36, and $T_z$ is torque input by rotation of rotor 22.

Two further factors may contribute, torque ratio and friction. Torque ratio is an outcome of an Euler requirement that for every 4θ of nutation, each wobble plate must also rotate by one wobble tooth 62. Gear ratio may be converted to torque ratio by dividing nutation by the rotational increment represented by the gear ratio, or angular width of one wobble tooth. The torque ratio of the system may be written as $$\frac{4\theta}{2\pi} GR$$

where GR is the gear ratio between rotor 22 and wobble plates 26, 28.

Due to a linear relationship with velocity, friction may scale with angular velocity of the wobble plate. A governing equation for the system may be written as $$\sin(2\theta) T_z \left(1 - \mu \left(\frac{4\theta}{2\pi} GR\right) \omega_z\right) = I_z \dot{\omega}_z + I_x \left(\frac{4\theta}{2\pi} GR\right) \omega_z^2$$

where μ is an appropriate coefficient of friction between wobble teeth 62 and rotor teeth 50.

The brake module system may also be considered in terms of the virtual ellipses formed by projecting the wobble plates onto the rotor. Each wobble plate and the rotor may have generally one point of contact. An edge of the virtual ellipse may define in three dimensions a continuous line of contact of the elliptically interfacing wobble plate and rotor. The shape of the virtual ellipse may remain unchanged under a nutation of the wobble plate that encompasses four times the angle between the wobble axis 46 and central axis 36. Only the rotational frame of the line of contact, defined by Euler, may advance as the nutation occurs. Each point on the line of contact may fall on a compound geometrically distorted involute function, and the function may be symmetric under both rotation and nutation, allowing continuous energy transfer to and from the virtual ellipse.

The virtual ellipse may be static as the inertial frame rotates, with all points on the line of contact rotating in their own horizontal plane at a constant angular rate. A point on a radial edge of the wobble plate viewed during nutation may exhibit vertical motion with a constantly changing velocity. This change in velocity may require constant acceleration of the inertia of the wobble plate, absorbing kinetic energy input to the system.

As a consequence of this absorption of kinetic energy, the braking power of brake module 20 may be proportional to the square of the angular velocity of the rotor. Indeed, the braking power may be proportional to twice the square of the angular velocity, as each of first wobble plate 26 and second wobble plate 28 may similarly absorb energy. Accordingly, brake module 20 may have greater braking force at higher speeds and less braking force as rotor 22 approaches zero angular velocity.

When rotor 22 is at rest, brake module 20 has no braking power. That is, the brake module may not hold the rotor at rest. Instead, if stator structure 24 is held stationary, brake module 20 may oppose or resist an increase of the angular velocity of the rotor, with increasing power as the angular velocity increases. Brake module 20 may therefore not cause skidding of a braked wheel. Once the wheel reaches zero angular velocity, or ceases to turn, the brake module will no longer apply a braking force. However, it may be beneficial to use brake module 20 in combination with another brake mechanism, such as a parking brake, to hold a braked system at rest.

Nutational motion of wobble plates 26, 28 as described above, exerts axial forces. That is, forces parallel to central axis 36 that tend to separate rotor 22 and stators 30, 32. However, the axial forces in brake module 20 are balanced by inclusion of two wobble plates. Force exerted by first wobble plate 26 on rotor 22 is balanced by force exerted on the rotor by second wobble plate 28. Rotor 22 may be thereby centered along sleeve 34, between the wobble plates.

Similarly, axial force exerted by first wobble plate 26 on first stator 30 of stator structure 24 is balanced by force exerted on second stator 32 of the stator structure by second wobble plate 28. Stator structure 24 may therefore not experience a net axial force in either direction along central axis 36. Such balanced forces may allow brake module 20 to be mounted without thrust bearings.

B. Illustrative Disc Braking System

Figure 4:
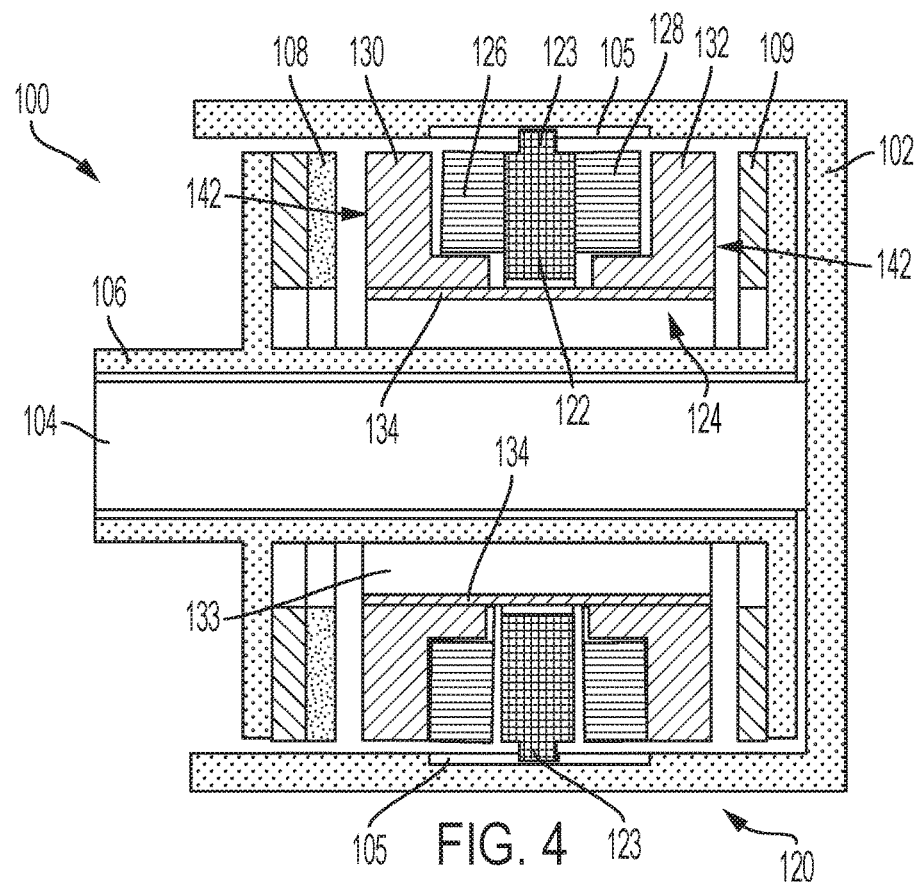
FIG. 4 is a schematic diagram of a wheel including an illustrative disc braking system as described herein, in an un-braked mode.
Figure 5:
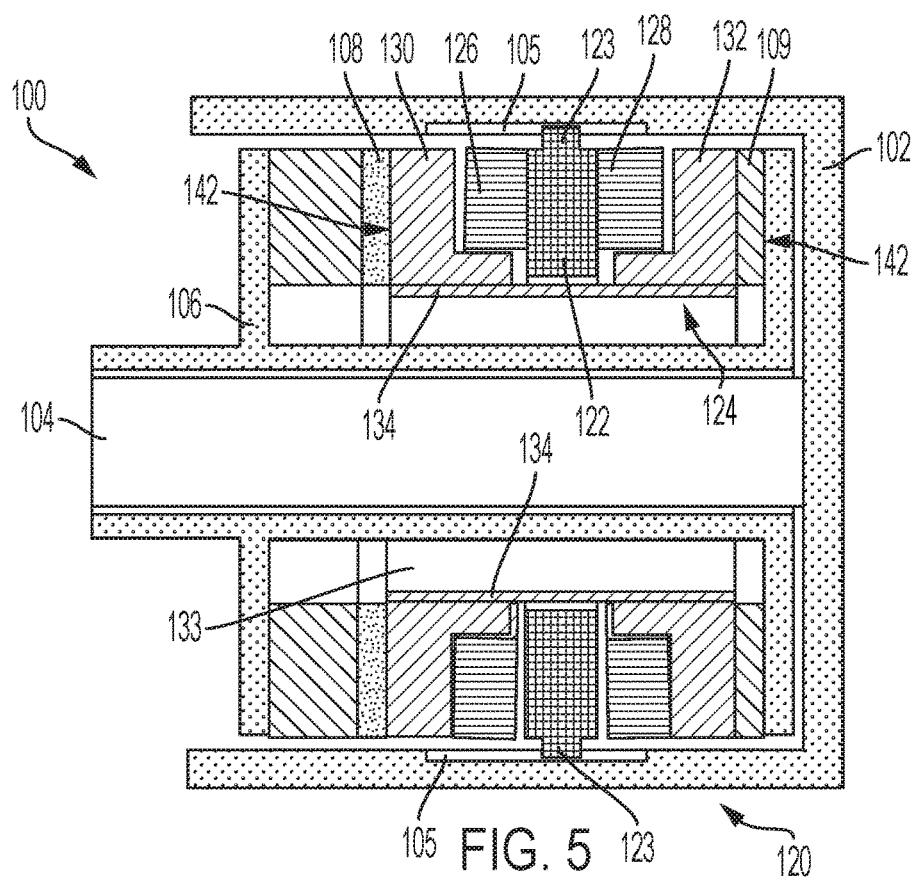
FIG. 5 is a schematic diagram of the wheel of FIG. 4, in a braking mode.

As shown in FIGS. 4-5, this section describes an illustrative braking system 100. Braking system 100 is an example of a nutational braking system, described above. The braking system includes a brake module 120 mounted in a wheel 102. Many components of brake module 120 are the same or similar to brake module 20 and are therefore similarly numbered.

Brake module 120 includes a rotor 122 and a stator structure 124. A first wobble plate 126 is disposed between a first side of rotor 122 and a first stator 130 of stator structure 124. A second wobble plate 128 is disposed between a second side of rotor 122 and a second stator 132 of stator structure 124. Each stator 130, 132 includes a planar surface 142 distal from rotor 122. Each of the rotor, wobble plates, and stators is toothed, as described above for brake module 20. Stator structure 124 further includes a hollow, cylindrical sleeve 134. The cylindrical sleeve defines a central opening 133 of brake module 120. The brake module is mounted in wheel 102 with an axle 104 extending through central opening 133.

Rotor 122 is keyed into wheel 102. That is, rotor 122 includes projections 123 from a peripheral edge of the rotor. The projections extend into corresponding slots 105 in the rim of the wheel. As wheel 102 rotates, slots 105 engage projections 123 to rotate rotor 122 with the wheel. However, rotor 122 and brake module 120 are free to move axially, parallel to axle 104, and/or along an elongate axis of slots 105. Rotor 122 and/or brake module 120 may be described as floating and/or slidably coupled to wheel 102. In the present example, rotor 122 is mounted similarly to a rotor of a floating disc brake. In some examples, rotor 122 may be mounted according to other mechanisms and/or techniques known in the art of brake design.

Also mounted in wheel 102 is a hydraulic caliper assembly 106 including a pair of brake pads 108, 109. Caliper assembly 106 is mounted on axle 104, and also extends through central opening 133 of brake module 120. Brake pad 109 is fixed relative to wheel 102, while brake pad 108 is movable along axle 104 by hydraulic action of caliper assembly 106. The brake pads are disposed on either side of stator structure 124, with fixed brake pad 109 adjacent second stator 132 and moveable brake pad 108 adjacent first stator 130.

Brake system 100 may be described as a disc-style brake, and brake module 120 may engage caliper assembly 106 similarly to a disc of a disc brake. In some examples brake module 120 may be used in place of a disc brake. A caliper assembly and/or wheel configured for use with a disc brake may be adapted and/or retrofitted for use with brake system 100.

Brake system 100 has a braking mode and an un-braked or free mode. FIG. 4 shows the brake system in the un-braked mode. Rotor 122 is approximately centered in slot 105, and brake module 120 is spaced from caliper assembly 106. That is, distal surface 142 of first stator 130 is spaced from brake pad 108 and distal surface 142 of second stator 132 is spaced from brake pad 109. In this mode, rotor 122 rotates with wheel 102. Wobble plates 126, 128 and stator structure 124 also freely rotate with the rotor and the wheel.

FIG. 5 shows brake system 100 in the braking mode. To transition from the un-braked mode to the braking mode, brake pad 108 is moved along axle 104 by the hydraulics of caliper assembly 106 into contact with distal surface 142 of first stator 130. Brake module 120 is urged along axle 104, with projections 123 moving in slots 105, until distal surface 142 of second stator 132 contacts brake pad 109.

In the braking mode, stator structure 124 is slowed and/or stopped by frictional contact between brake pads 108, 109 and first and second stators 130, 132. Rotor 122 rotates with wheel 102. The difference in rotation rates of the rotor and stators induces nutation of wobble plates 126, 128. This nutation absorbs rotational energy, thereby slowing wobble plates 126, 128 which in turn slow rotor 122 and wheel 102.

Under certain conditions, loss of traction may occur between brake pads 108, 109 and stators 130, 132. For example, if the torque applied to axle 104 exceeds a product of force exerted on the stators by the brake pads, a frictional coefficient appropriate to materials of the brake pads and the stator structure, and distance from the wheel's axis of rotation to a point of contact between the brake pads and the stators, then slipping may occur. Under such conditions, brake module 120 will release the torque load. That is, rotation of stators 130, 132 may be restricted, but not prevented. Some rotational energy of axle 104 may be dissipated by nutation of the wobble plates, while remaining rotational energy may be transmitted to the stators.

C. Illustrative Hybrid Braking System

Figure 6:
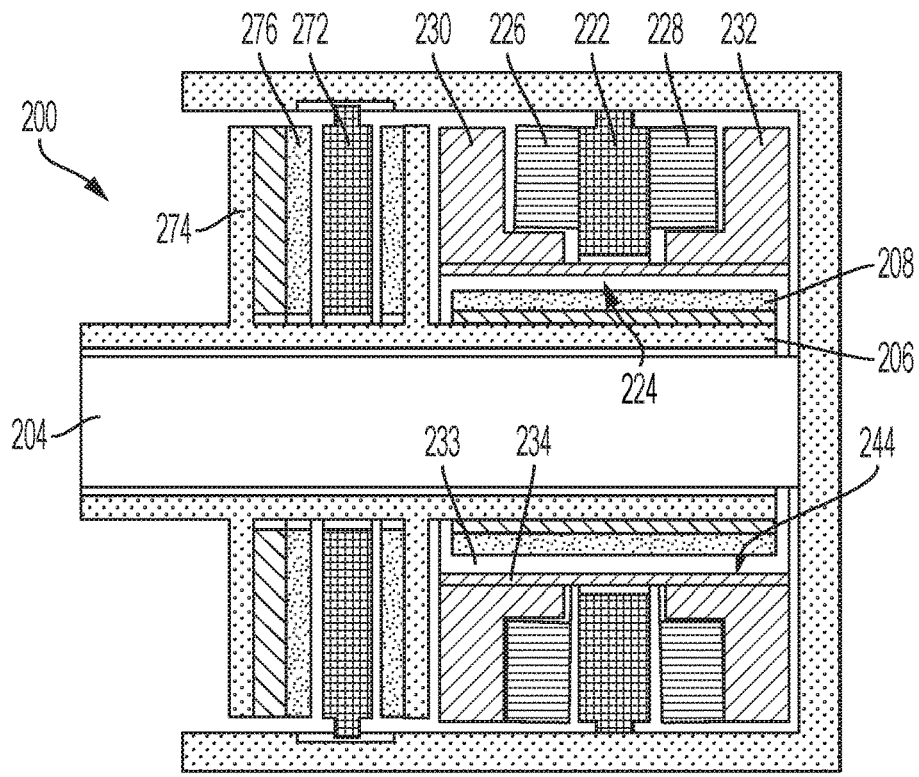
FIG. 6 is a schematic diagram of a wheel including an illustrative hybrid disc and drum braking system as described herein, in an un-braked mode.
Figure 7:
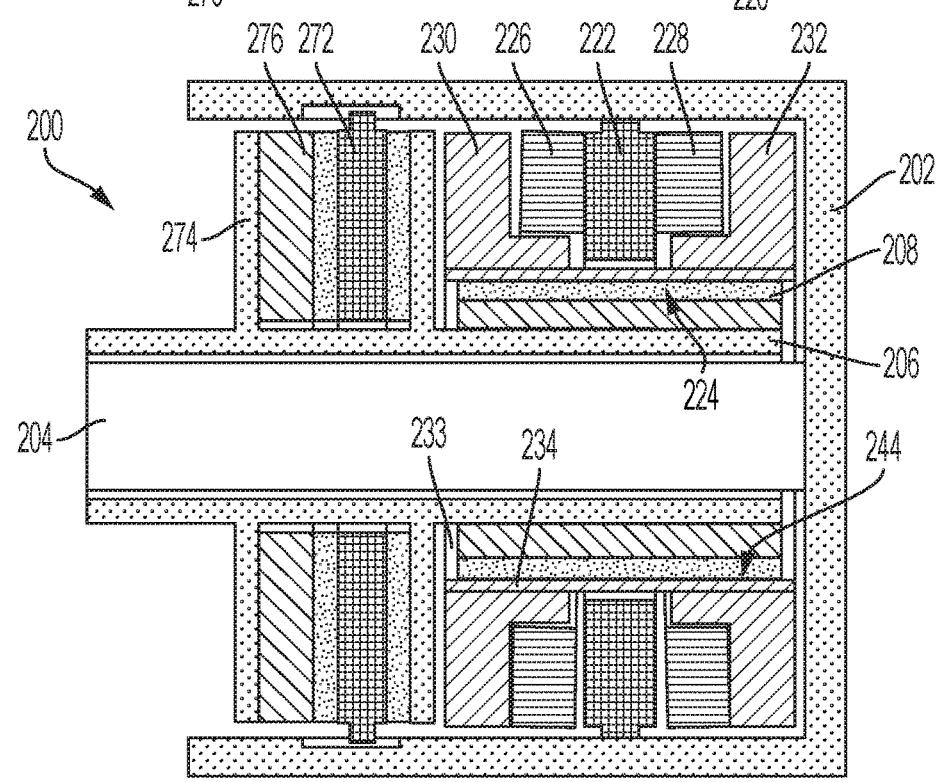
FIG. 7 is a schematic diagram of the wheel of FIG. 6, in a braking mode.

As shown in FIGS. 6-7, this section describes an illustrative braking system 200. Braking system 200 is an example of a nutational braking system, described above. The braking system includes a brake module 220 mounted in a wheel 202. Many components of brake system 200 are the same or similar to brake system 100 and are therefore similarly numbered.

Brake module 220 includes a rotor 222 and a stator structure 224. A first wobble plate 226 is disposed between a first side of rotor 222 and a first stator 230 of stator structure 224. A second wobble plate 228 is disposed between a second side of rotor 222 and a second stator 232 of stator structure 224. Each of the rotor, wobble plates, and stators is toothed, as described above for brake module 20. Stator structure 224 further includes a hollow, cylindrical sleeve 234. The cylindrical sleeve defines a central opening 233 of brake module 220. The brake module is mounted in wheel 202 with an axle 204 extending through central opening 233.

Rotor 222 is suspended in wheel 202, with a periphery of the rotor being rigidly fixed to the wheel. As a consequence, wheel 202 and rotor 222 rotate together. A brake shoe 206 is mounted on axle 204, in central opening 233 of brake module 220. The brake shoe may be hydraulically actuated, cammed, or include any appropriate actuating mechanism. A brake lining 208 of the shoe is configured to engage an inner surface 244 of cylindrical sleeve 234.

Brake system 200 further includes a disc brake 270. The disc brake may function as a supplemental and/or parking brake, to provide holding force when wheel 202 is at rest. In the present example, disc brake 270 includes a single floating disc 272 keyed into wheel 202 and a hydraulic caliper assembly 274 with brake pads 276. Brake system 200 may include any effective supplemental brake or brakes including, but not limited to a fixed disc brake, a drum brake, a multi-disc brake, and/or an expander tube brake.

Brake system 200 may be described as a drum-style brake or hybrid disc and drum brake, and brake module 220 may engage brake shoe 206 similarly to a drum of a drum brake. In some examples brake module 220 may be used in place of a drum brake. A brake shoe and/or wheel configured for use with a drum brake may be adapted and/or retrofitted for use with brake system 200.

In the present example, disc brake 270 and brake module 220 are configured for independent operation. That is, each of the disc brake and brake module have a braking mode and an un-braked mode and can independently change modes. Caliper assembly 274 and brake shoe 206 are structurally linked to facilitate anchoring to a non-rotating structure, but are operated by independent hydraulics. In some examples, disc brake 270 and brake module 220 may be operationally linked. For instance, caliper assembly 274 and brake shoe 206 may be actuated by a single hydraulic system.

FIG. 4 shows both brake module 220 and disc brake 270 in the un-braked mode. In brake module 220, lining 208 of brake shoe 206 is spaced from inner surface 244 of cylindrical sleeve 234. In the un-braked mode of the brake module, wobble plates 226, 228 and stator structure 224 freely rotate with rotor 222 and wheel 202.

FIG. 5 shows both brake module 220 and disc brake 270 in the braking mode. To transition from the free modes as shown in FIG. 4, brake module 220 may first be placed in the braking mode. Once wheel 202 is sufficiently slowed, disc brake 270 may be placed in the braking mode to bring the wheel to a complete stop and hold the wheel at rest. When brake module 220 is changed to the braking mode, brake shoe 206 expands to bring lining 208 into contact with inner surface 244 of cylindrical sleeve 234.

In the braking mode of the brake module, stator structure 224 is slowed and/or stopped by frictional contact between lining 208 and inner surface 244. Rotor 222 rotates with wheel 202. The difference in rotation rates of the rotor and stators induces nutation of wobble plates 226, 228. This nutation absorbs rotational energy, thereby slowing wobble plates 226, 228 which in turn slow rotor 222 and wheel 202.

D. Illustrative Method of Braking a Wheel

Figure 8:
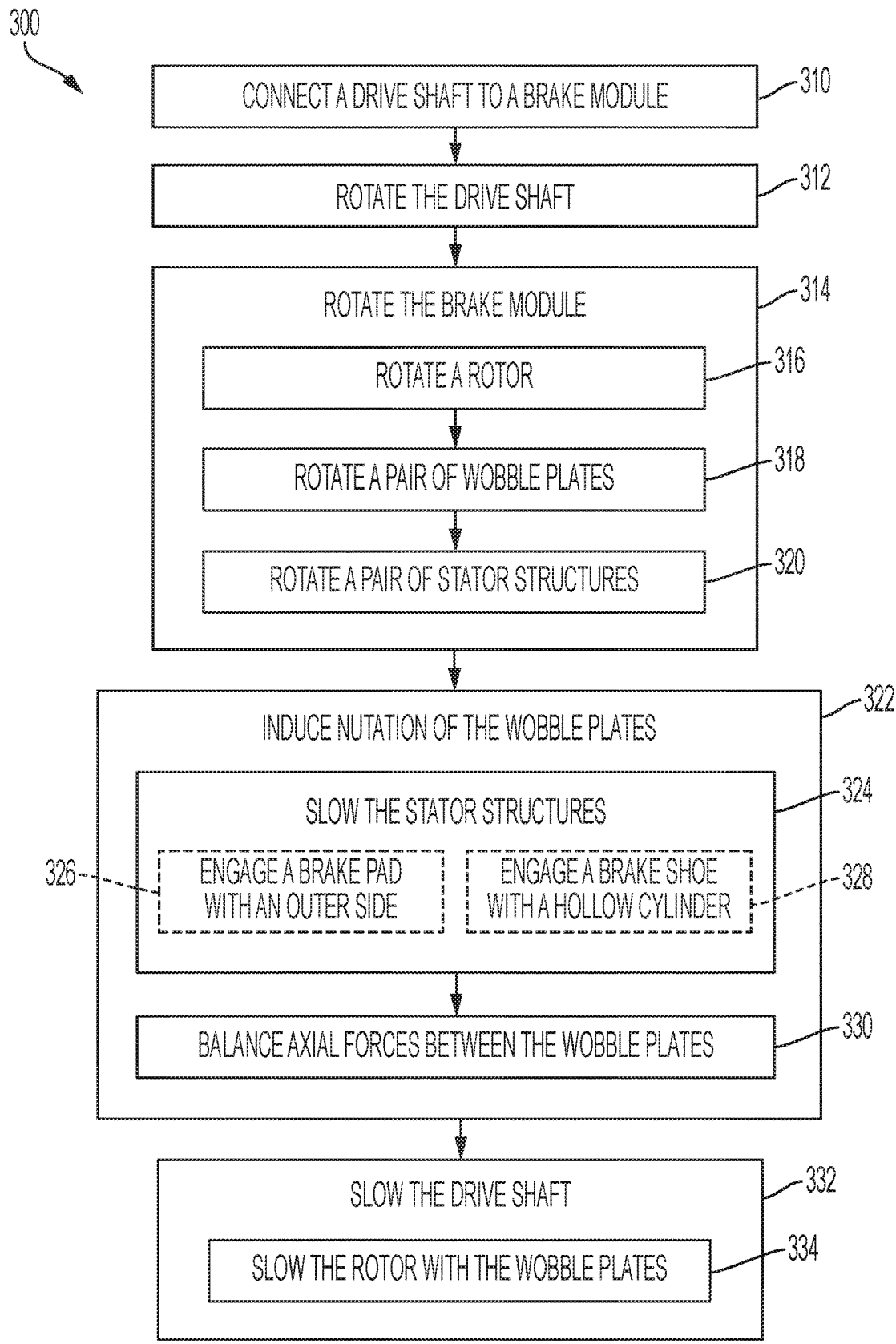
FIG. 8 is a flow chart depicting steps of an illustrative method for dissipating rotational energy, according to the present teachings.

This section describes steps of an illustrative method 300 for dissipating rotational energy with a braking system; see FIG. 8. Aspects of braking systems described above may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 300 are described below and depicted in FIG. 8, the steps need not necessarily all be performed, and in some cases may be performed simultaneously or in a different order than the order shown.

At step 310, the method includes connecting a drive shaft to a brake module. The brake module may be rotationally connected to the drive shaft directly and/or indirectly. For example, a rotor of the brake module may be rigidly fixed to the drive shaft by one or more spokes. For another example, the brake module may be connected to an axle of a wheel driven by the drive shaft, may be keyed to the wheel, and/or may be connected to the wheel by a splined interface. The drive shaft may be included in a vehicle such as an aircraft, a car, or a train, or may be included in an engine of other machines such as a generator or manufacturing equipment. In some examples, step 310 may include connecting a brake module to other rotating bodies for which braking is desired.

Step 312 of the method includes rotating the drive shaft. The drive shaft may be rotated by any effective means, including but not limited to a combustion engine, electric motor, pneumatic motor, and/or connection with another rotating body. Step 314 includes rotating the brake module, which may be effected by the connection between the drive shaft and the brake module created in step 310.

Substep 316 of step 314 includes rotating a rotor of the brake module. The rotor may be rotationally linked to the drive shaft in any effective manner. That is, the rotor may rotate with the drive shaft, and acceleration or deceleration of the drive shaft may result in corresponding acceleration of the rotor. Similarly, deceleration of the rotor may result in corresponding deceleration of the drive shaft.

Substep 318 of step 314 includes rotating a pair of wobble plates of the brake module. Each wobble plate may include a set of teeth which engage a corresponding set of teeth on a corresponding side of the rotor. Contact between the teeth of the rotor and the teeth of the wobble plates may cause the wobble plates to rotate with the rotor.

Substep 320 of step 314 includes rotating a pair of stator structures. Each stator structure may include a set of teeth which engage a corresponding set of teeth on a corresponding one of the pair of wobble plates. Contact between the teeth of the wobble plates and the teeth of the stators may cause the stators to rotate with the wobble plates and the rotor.

At step 322, the method includes inducing nutation of the wobble plates. The wobble plates may be disposed at an angle relative to the rotor and stators. Each wobble plate may also have a different number of teeth than the corresponding set of teeth on the rotor and/or the corresponding stator. The number of teeth may differ by one, or by a similarly small number. The teeth of the wobble plates, the rotor, and/or the stator may be shaped to reduce eccentric motion and permit nutation without binding.

Substep 324 includes slowing the stator structures. The stator structures may be slowed relative to the rotor, such that contact forces between the teeth of each stator and the teeth of the corresponding wobble plate urge the wobble plate to nutate. The pair of stator structures may be simultaneously and equally slowed, such that the wobble plates simultaneously begin nutation and continue to nutate at an equal rate.

Optional substep 326 of substep 324 includes engaging a brake pad with an outer side of each stator structure. Each stator may include a planar surface such that the brake pad may be brought into frictional contact with the stator during rotation, and thereby slow the stator. For example, a surface of each stator axially opposite the corresponding wobble plate may be contacted. In some examples, the brake module may be configured for engagement by a hydraulic disc brake caliper.

Optional substep 328 of substep 324 includes engaging a brake shoe with a hollow cylinder of the brake module. The pair of stator structures may be rigidly connected by a hollow cylinder. For example, a cylindrical sleeve may extend through central apertures of the stator structures, wobble plates, and rotor. A brake shoe disposed inside the sleeve may be brought into frictional contact with the sleeve, thereby slowing the sleeve and the connected stator structures.

Substep 330 of step 322 includes balancing the axial forces between the wobble plates. The pair of wobble plates may be matching, though opposed in orientation. Accordingly, under nutation the wobble plates may generate equal and opposite axial forces. The rotor may be allowed to move and/or float axially, such that the balanced axial forces of the wobble plates tend to center the rotor. The stator structures may be rigidly connected as one structure, such that the axial forces of the wobble plates cause no net motion of the structure.

Step 332 of method 300 includes slowing the drive shaft. As noted above, the rotor may be rotationally linked to the drive shaft such that deceleration of the rotor may result in corresponding deceleration of the drive shaft. Substep 334 of step 332 includes slowing the rotor with the wobble plates. The rotor may in turn slow the drive shaft.

Nutation of the wobble plates caused by slowing of the stator structures in substep 324 may absorb rotational energy. The wobble plates may therefore slow in rotational speed as energy is absorbed. Interaction between the teeth of the wobble plates and the corresponding teeth of the rotor may in turn slow the rotor.

Method 300, in particular steps 312-332, may be repeated throughout operation of a machine or vehicle including a brake module. Typically, steps 322-332 of the method may be performed when the drive shaft is not driven or under torque load. That is, the brake may not be applied at the same time as the shaft is driven. In some examples, the brake module may function as a speed limiter, emergency brake, or other mechanism. In such examples, steps 322-332 may be performed while the shaft is driven, for instance to limit speed of the shaft and/or absorb excess rotational energy.

Illustrative Combinations and Additional Examples

This section describes additional aspects and features of braking systems, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A. A brake system, comprising:
a rotor rotationally connected to a shaft configured to rotate around a central axis, the rotor having a first side opposite from a second side,
a first stator structure on the first side of the rotor, and a second stator structure on the second side of the rotor, and
a first wobble plate between the first side of the rotor and the first stator structure, and a second wobble plate between the second side of the rotor and the second stator structure, wherein each of the first and second wobble plates are configured to nutate when the first and second stator structures decrease rotation rate compared to the rotation rate of the rotor.

A1. The brake system of A, wherein the first stator structure is rigidly connected to the second stator structure by a hollow cylindrical sleeve.

A2. The brake system of A1, further comprising:
a brake shoe configured to frictionally engage an inner surface of the hollow cylindrical sleeve, slowing the first and second stator structures and inducing nutation of the first and second wobble plates.

A3. The brake system of any of A-A2, further comprising:
brake pads configured to frictionally engage the first and second stator structures simultaneously, inducing nutation of the first and second wobble plates.

A4. The brake system of any of A-A3, wherein the shaft is an axle connected to a wheel on a vehicle.

A5. The brake system of A4, wherein the wheel is configured for landing and
take-off of an aircraft.

A6. The brake system of any of A-A5, wherein each stator structure has a shoulder, the adjacent wobble plate being axially aligned through contact with the shoulder.

A7. The brake system of any of A-A6, wherein forces parallel to the central axis that result from nutation of the first wobble plate are balanced by forces resulting from nutation of the second wobble plate.

A8. The brake system of any of A-A7, wherein the rotor, the first and second wobble plates, and the first and second stator structures move without support from a bearing.

A9. The brake system of any of A-A8, wherein each wobble plate has an inner side and an outer side and each wobble plate has teeth on the inner side and teeth on the outer side, the teeth on the inner side being larger than the teeth on the outer side.

A10. The brake system of A9, wherein each stator has an inner side and has teeth on the inner side, a number of teeth on the inner side of each stator being equal to a number of teeth on the outer side of each wobble plate.

A11. The brake system of A9 or A10, wherein the rotor has an equal number of teeth on the first side and on the second side, and the number of teeth on each side of the rotor differs by one from a number of teeth on the inner side of each wobble plate.

A12. The brake system of any of A-A11, wherein each wobble plate is disposed at an oblique angle relative to the central axis.

A13. The brake system of any of A-A12, wherein the rotor is rigidly connected to the shaft.

B. A brake system, comprising:
a first stator gear;
a second stator gear, rigidly connected to the first stator gear;
a rotor gear disposed between the first stator gear and the second stator gear;
a first wobble gear engaging the first stator gear and the rotor gear; and
a second wobble gear engaging the second stator gear and the rotor gear;
wherein rotation of the rotor gear causes the first wobble gear, the second wobble gear, the first stator gear, and the second stator gear to rotate; and
wherein slowing the first and second stator gears relative to the rotor gear induces nutation of the first and second wobble gears, and nutation of the first and second wobble gears slows the rotor gear.

B1. The brake system of B, wherein a periphery of the rotor gear is rigidly connected to an axle.

B2. The brake system of B or B1, further comprising brake pads configured to selectively contact a planar outer surface of each of the first and second stator gears.

B3. The brake system of any of B-B2, further comprising a hollow cylindrical sleeve connecting the first and second stator gears and a brake shoe configured to selectively contact an inner surface of the hollow cylindrical sleeve.

B4. The brake system of any of B-B3, wherein the first stator gear, the second stator gear, the rotor gear, the first wobble gear, and the second wobble gear are annular.

B5. The brake system of any of B-B4, wherein the rotor gear has a rotation axis, the first wobble gear has a first wobble axis, and the second wobble gear has a second wobble axis, the first and second wobble axes each being disposed at an oblique angle relative to the rotation axis.

B6. The brake system of any of B-B5, wherein each stator gear includes a shoulder, each engaging wobble gear being axially aligned through contact with the shoulder.

C. A method of dissipating rotational energy in a braking system, comprising:
providing a drive shaft connected to a rotor and a pair of wobble plates engaging opposite sides of the rotor, each wobble plate having an outer side engaging a stator structure,
rotating the drive shaft, rotor, pair of wobble plates, and stator structures at a same rotational speed, and
inducing nutation of the pair of wobble plates by slowing the rotational speed of the stator structures.

C1. The method of C, wherein the drive shaft is connected to a wheel of an aircraft.

C2. The method of C or C1, wherein each stator structure has an outer side, the inducing step including frictionally engaging a brake pad with the outer side of each stator structure.

C3. The method of any of C-C2, wherein the stator structures are connected by a hollow cylinder, the inducing step including frictionally engaging a brake shoe with an inner surface of the hollow cylinder.

C4. The method of any of C-C3, wherein the inducing step includes balancing axial forces from one of the pair of wobble plates with axial forces from the other of the pair of wobble plates.

C5. The method of any of C-C4, wherein the rotating and inducing steps are performed without support from a bearing.

C6. The method of any of C-C5, further including slowing the drive shaft by slowing the rotor with the pair of nutating wobble plates.

Advantages, Features, and Benefits

The different examples of the brake system described herein provide several advantages over known solutions for braking rotational motion. For example, illustrative examples described herein allow a majority of rotational energy to be dissipated without generating thermal output.

Additionally, and among other benefits, illustrative examples described herein allow a passive anti-skid functionality by automatic release of the torque load when loss of traction occurs.

Additionally, and among other benefits, illustrative examples described herein can be easily added to existing vehicle designs or retrofitted to replace existing brake systems.

Additionally, and among other benefits, illustrative examples described herein allow a balanced system without use of bearings.

No known system or device can perform these functions, particularly in such a small volume. Thus, the illustrative examples described herein are particularly useful for aircraft and other vehicles requiring high performance braking systems that are also light and compact. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A brake system, comprising:
a shaft configured to rotate around a central axis,
a rotor, rotationally connected to the shaft, the rotor having a first side opposite from a second side,
a first stator structure on the first side of the rotor and a second stator structure on the second side of the rotor,
a frictional braking mechanism, configured to slow rotation of the first stator structure and the second stator structure, and
a first wobble plate, located between and engaged with the first side of the rotor and the first stator structure, and a second wobble plate located between and engaged with the second side of the rotor and the second stator structure,
wherein:
the first stator structure is rigidly connected to the second stator structure, and
each of the first wobble plate and the second wobble plate is configured to nutate when a rotation rate of the first stator structure and the second stator structure is decreased by the frictional braking mechanism.

2. The brake system of claim 1, wherein the first stator structure is rigidly connected to the second stator structure by a hollow cylindrical sleeve.

3. The brake system of claim 2, wherein the frictional braking mechanism comprises:
a brake shoe configured to frictionally engage an inner surface of the hollow cylindrical sleeve, slowing the first stator structure and the second stator structure and inducing nutation of the first wobble plate and the second wobble plate.

4. The brake system of claim 1, wherein the frictional braking mechanism comprises:
brake pads configured to frictionally engage the first stator structure and the second stator structure simultaneously, inducing nutation of the first wobble plate and the second wobble plate.

5. A vehicle, comprising the brake system of claim 1, wherein the shaft is an axle connected to a wheel on the vehicle.

6. The vehicle of claim 5, wherein the wheel is configured for landing and take-off of an aircraft.

7. The brake system of claim 1, wherein each of the first stator structure and the second stator structure has a shoulder, the first wobble plate being axially aligned through contact with the shoulder of the first stator structure and the second wobble plate being axially aligned through contact with the shoulder of the second stator structure.

8. The brake system of claim 1, wherein forces parallel to the central axis that result from nutation of the first wobble plate are balanced by forces resulting from nutation of the second wobble plate.

9. The brake system of claim 1, wherein the rotor, the first wobble plate, the second wobble plate, the first stator structure, and the second stator structure move without support from a bearing.

10. The brake system of claim 1, wherein:
each of the first wobble plate and the second wobble plate has an inner side and an outer side, each of the first wobble plate and the second wobble plate has teeth on the inner side and teeth on the outer side, and the teeth on the inner side are larger than the teeth on the outer side.

11. A brake system, comprising:
a first stator gear,
a second stator gear, rigidly connected to the first stator gear,
a rotor gear, arranged between the first stator gear and the second stator gear,
a first wobble gear, engaging the first stator gear and the rotor gear, a second wobble gear, engaging the second stator gear and the rotor gear, and a frictional braking mechanism, configured to slow rotation of the first stator gear and the second stator gear, wherein:

rotation of the rotor gear causes the first wobble gear, the second wobble gear, the first stator gear, and the second stator gear to rotate, slowing the first stator gear and the second stator gear relative to the rotor gear induces nutation of the first wobble gear and the second wobble gear, and nutation of the first wobble gear and the second wobble gear slows the rotor gear.

12. The brake system of claim 11, wherein a periphery of the rotor gear is rigidly connected to an axle.

13. The brake system of claim 11, wherein the first stator gear, the second stator gear, the rotor gear, the first wobble gear, and the second wobble gear are annular.

14. The brake system of claim 11, wherein:
the rotor gear has a rotation axis,
the first wobble gear has a first wobble axis,
the second wobble gear has a second wobble axis, and
each of the first wobble axis and the second wobble axis is oblique relative to the rotation axis.

15. A method of dissipating rotational energy in a braking system, the method comprising steps of:

rotating (a) a drive shaft; (b) a rotor connected to the drive shaft; (c) a pair of wobble plates, wherein each of the pair of wobble plates engages a respective side of the rotor; and (d) a pair of stator structures, wherein each of the pair of stator structures engages an outer side of a respective wobble plate of the pair of wobble plates at a rotational speed, and inducing nutation of the pair of wobble plates by slowing the rotational speed of the pair of stator structures using a frictional braking mechanism.

16. The method of claim 15, wherein the drive shaft is connected to a wheel of an aircraft.

17. The method of claim 15, wherein:
each of the pair of stator structures has an outer side, and
the step of inducing nutation of the pair of wobble plates comprises frictionally engaging a respective brake pad with the outer side of a respective one of the pair of stator structures.

18. The method of claim 15, wherein:
individual stator structures of the pair of stator structures are interconnected by a hollow cylinder, and
the step of inducing nutation of the pair of wobble plates including comprises frictionally engaging a brake shoe with an inner surface of the hollow cylinder.

19. The method of claim 15, wherein the inducing step of inducing nutation of the pair of wobble plates comprises balancing axial forces from one of the pair of wobble plates with axial forces from the other of the pair of wobble plates.

20. The method of claim 15, further comprising slowing the drive shaft by slowing the rotor with the pair of wobble plates, wherein each of the pair of wobble plates is nutating.

* * * * *